Patented Sept. 26, 1933

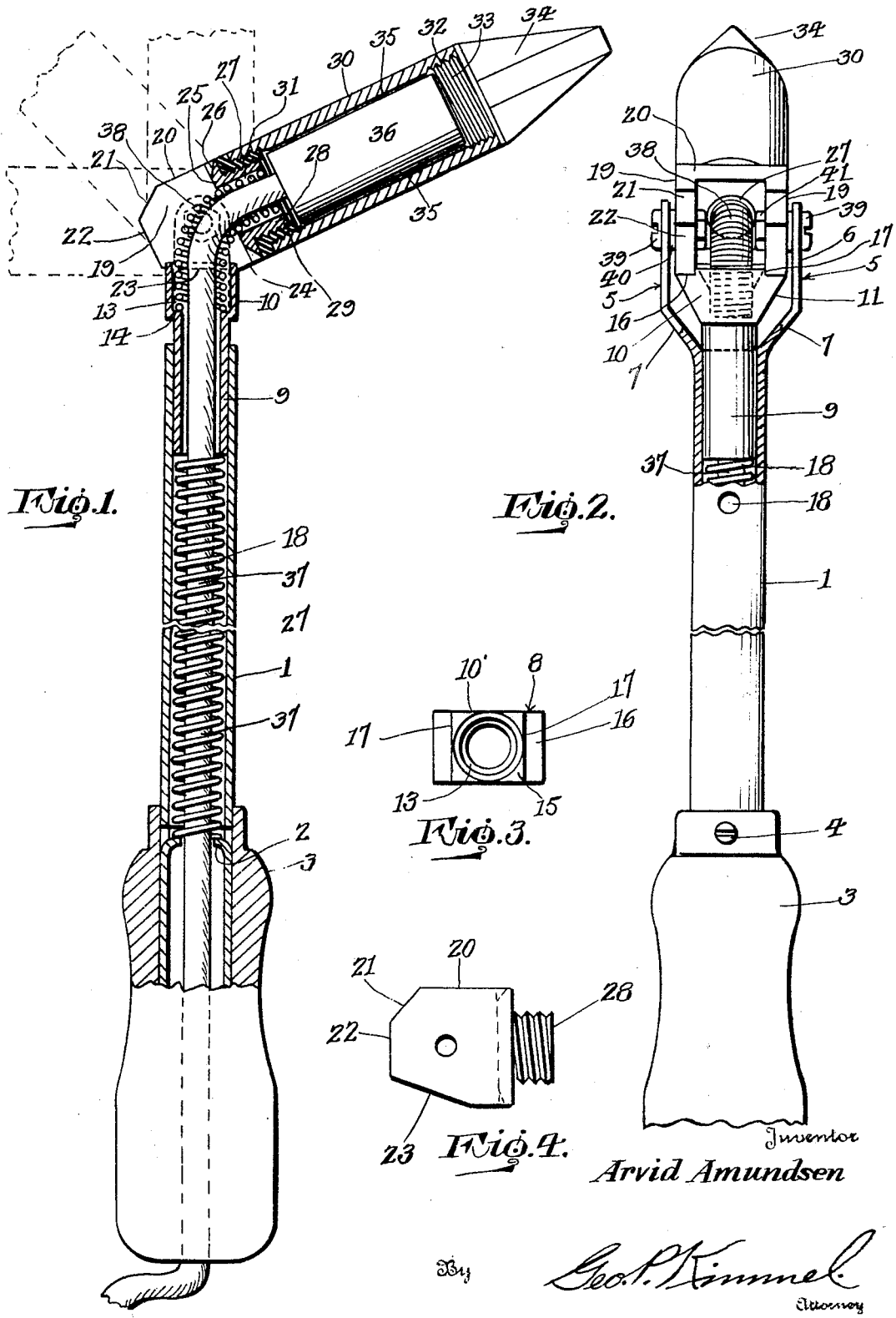

1,928,522

UNITED STATES PATENT OFFICE 1,928,522

SOLDERING IRON

Arvid Amundsen, Brighton, Mass.

Application September 15, 1932
Serial No. 633,342

5 Claims. (Cl. 219—26)

This invention relates to a soldering iron, and has for its object to provide, in a manner as hereinafter set forth, a tool of such class including means whereby the head thereof can be automatically adjusted to and retained at various angles for soldering at points which cannot be reached by a stationary head.

A further object of the invention is to provide, in a manner as hereinafter set forth, a soldering iron of the electrically heated type including an angularly adjustable head for soldering at points which cannot be reached by a non-adjustable head, and whereby the adjustable head can be shifted automatically from one angular position to another by the application of pressure on the handle of the tool by one carrying out a soldering operation.

Further objects of the invention are to provide, in a manner as hereinafter set forth, an adjustable soldering iron which is simple in its construction and arrangement, strong, durable, compact, thoroughly efficient in its use, expeditiously adjusted, readily assembled, and comparatively inexpensive to manufacture.

To the above ends essentially, and to others which may hereinafter appear, the invention consists of such parts, and such combination of parts as fall within the scope of the invention as claimed.

In the drawing:

Figure 1 is a longitudinal sectional view of the soldering iron.

Figure 2 is a fragmentary view, broken away, in rear elevation.

Figure 3 is a top plan view of the spring controlled holder forming an element of the tool.

Figure 4 is a side elevation of the head setting device.

Referring to the drawing, 1 indicates a tubular shank of the desired length and diameter and formed diametrically thereof between its transverse median and inner end with inset portions 2 forming abutments for a purpose to be referred to. Mounted upon the inner porton of shank 1 is a handle 3. Holdfast means 4 detachably connects the shank 1 and handle 3 together.

Formed integral with the outer end of shank 1 is a pair of oppositely disposed parallel, spaced arms 5 of like form. Each arm includes an outer part 6 and an inner part 7, the latter being of less length than the former. The part 7 at its inner end is integral with the outer edge of shank 1 and extends outwardly and at a forward inclination with respect to the shank.

Slidably mounted in the outer portion of shank 1, as well as projecting from the outer end of the latter is a spring controlled holder 8 for releasably maintaining the adjustable head, to be presently referred to, in angular set position. The holder includes a tubular stem 9 terminating at its outer end in a flared abutment 10 whch is diametrically disposed and outset with respect to said end. The abutment in sectional plan is of rectangular form and provided with flat sides 10' and ends 11 inclining outwardly and forwardly from the point of joinder of the abutment with the stem. The abutment 10 is formed with a centrally disposed opening 13 of greater diameter than the inner diameter of stem 9 to provide the holder with an internal annular shoulder 14. The forward face 15 of abutment 10 is rabbeted at each end to form transverse bearing surfaces 16 and transverse shoulders 17. The abutment 10 is arranged between and spaced from the arms 5.

Arranged within the shank and interposed between the inner end of stem 9 and the abutments 2, is a coiled controlling spring 18, which functions to maintain the holder 8 in projected relation with respect to the shank. The shank 1 has a ventilating opening 18'.

Positioned between the arms 5, forwardly of the holder 8 and bearing against the surfaces 16, is a pair of parallel spaced adjusting members 19 of like form and of polygonal contour. Each of said members has its edge formed with head setting portions 20, 21, 22, 23 and 24. The portions 21, 22 are disposed at opposite and different inclinations with respect to each other, and also disposed at an inclination with respect to the portions 20, 22 and 24. The portions 20, 22, and 24 are straight. The portions 20 of members 19 are to seat against the bearing surfaces 16 for releasably maintaining the head at right angles to shank 1, that is to say for disposing the head at 90°; the portions 21 of members 19 are to seat against the bearing surfaces 16 for disposing the head at an angle of 45°; the portions 22 of members 19 are to seat against the bearing surfaces 19 for disposing the head straight, that is to say as a lengthwise continuation of shank 1 and the portions 23 of members 19 are to seat against the bearing surfaces 16 for disposing the head at an angle of 70°. It will be understood that the head setting portions on the members 19 may be set up in a manner to dispose the head at other angular degrees than that as stated.

The members 19 are connected together at their outer ends by a flat cross piece 25 having beveled side edges 26. The cross piece 25 has a central opening 27 and an integral, outwardly directed peripherally threaded collar 28. The inner face of the latter registers with the wall of the opening 27.

Seated against the cross piece and threadedly engaging with the collar 28, is a flanged, internally and externally threaded bushing 29 of insulation which projects beyond the free edge of collar 28.

Connected to the bushing 29 and extending forwardly therefrom is a sleeve 30 formed on its inner face at the inner and outer end of the latter with groups of threads 31, 32 respectively. The threads 31 engage with the threads of the bushing 29.

Extending into the outer end of sleeve 30 and engaging with the threads 32, is the reduced peripherally threaded shank 33 of the tapered head 34, the latter abuts against the outer end edge of sleeve 30.

The sleeve 30 provides a chamber 35 for an electrical heating element 36, the latter being interposed between bushing 29 and shank 33. Leading to the element 36 is a cord 37 enclosing the circuit connections which extend through the shank 1, openings 13, 27 and collar 28. The spring 18 encompasses the cord 37.

Surrounding cord 37, abutting shoulder 14 and extending into collar 28 is a coiled spring 38 functioning as a holder and protector for the cord.

The members 19 are pivotally mounted upon a pair of short, oppositely disposed headed bolts 39 carried by the arms 5. Interposed between the members 19 and arms 5 are spacers 40 mounted on the bolts 39. The inner ends of the latter carry retaining nuts 41 for the members 19.

The head 34 can be adjusted from one angular position to another, while in use, by pressing the tool against the work whereby the head will snap from the position set to another angular position, the latter depending upon what setting portions on the members 19 seat against the bearing surfaces. Under such conditions the angle in which the head extends is changed automatically.

The tool can also be used as a non-electric one, yet embodying the automatic adjusting feature, in this connection the sleeve 30 and head 34 will be removed, and a solid iron head secured to the bushing or collar. The solid iron head being heated by a torch and as the adjusting elements of the tool are intact, the solid iron head can be angularly adjusted in the same manner as head 34.

What I claim is:—

1. In a soldering iron, a shank provided with a pair of opposed spaced arms at its outer end, a head arranged adjacent said arms and angularly adjustable with respect thereto, a shiftable adjuster structure for the head extending between said arms and having means at its outer end for securing the head thereto, said structure being bifurcated from said means to its inner end, spaced means carried by said arms for pivotally supporting said structure, a spring controlled holder arranged within and extended from said end of the shank, said holder being formed at its outer end with an abutment arranged between said arms permanently engaging the inner end of said structure, said abutment and the inner end of said structure having coacting means for releasably holding the structure in set position to maintain the head adjusted, and a spring seated at one end in said holder and having its other end bearing against the head, said spring extending through said structure and bearing against the abutment.

2. In a soldering iron, a shank provided with a pair of opposed spaced arms at its outer end, a head arranged adjacent said arms and angularly adjustable with respect thereto, a shiftable adjuster structure for the head extending between said arms and having means at its outer end for securing the head thereto, said structure being bifurcated from said means to its inner end, spaced means carried by said arms for pivotally supporting said structure, a spring controlled holder arranged within and extended from said end of the shank, said holder being formed at its outer end with an abutment arranged between said arms permanently engaging the inner end of said structure, said abutment and the inner end of said structure having coacting means for releasably holding the structure in set position to maintain the head adjusted, a spring seated at one end in said holder and having its other end bearing against the head, said spring extending through said structure and bearing against the abutment, the said means at the inner end of said structure consisting of a pair of spaced parallel inner end edges of like form and each provided with edge portions disposed at an angle to each other, and the said means on the abutment consisting of a pair of spaced parallel bearing surfaces for abutting simultaneously a pair of parallel selective edge portions of said inner end edges.

3. In a soldering iron, a shank provided with a pair of outset spaced arms at its outer end, a head arranged adjacent said arms and angularly adjustable with respect thereto, a shiftable adjuster structure for the head extending between said arms and having means at its outer end for securing the head thereto, said structure being bifurcated from said means to its inner end to provide a pair of inner end edges, each of said edges being of angled contour, means carried by said arms for pivotally supporting said structure, a spring controlled holder arranged within and extended from said end of the shank, said holder being formed at its outer end with a flared abutment having spaced means permanently contacting and coacting with the inner edges of said structure for releasably holding the latter in set position to maintain the head adjusted, and a spring extending through said structure and bearing against said head and abutment.

4. In a soldering iron, a tubular shank provided with a pair of arms at its outer end, a head arranged adjacent said arms and angularly adjustable with respect thereto, a shiftable adjuster structure for the head extending between said arms and having apertured means at its outer end for securing the head thereto, said structure being bifurcated from said means to its inner end to provide a pair of inner end edges, each of said edges being of angled contour, spaced means carried by said arms for pivotally supporting said structure inwardly of said apertured means, a spring controlled tubular holder slidably mounted within and extended from said end of the shank, said holder being formed at its outer end with a flared abutment arranged between said arms, said abutment being provided with spaced means permanently contacting and coacting with selected parallel parts of said inner end edges for releasably holding said structure in set position to maintain the head adjusted, and a spring extending through said structure and bearing against said head and abutment.

5. In a soldering iron, a tubular shank provided with a pair of arms at its outer end, a head arranged adjacent said arms and angularly adjustable with respect thereto, a shiftable adjuster structure for the head extending between said arms and having apertured means at its outer end for securing the head thereto, said structure being bifurcated from said means to its inner end to provide a pair of inner end edges, each of said edges being of angled contour, spaced means carried by said arms for pivotally supporting said structure inwardly of said apertured means, and a spring controlled tubular holder slidably mounted within and extended from said end of the shank, said holder being formed at its outer end with a flared abutment arranged between said arms, said abutment being provided with spaced means permanently contacting and coacting with selected parallel parts of said inner end edges for releasably holding said structure in set position to maintain the head adjusted.

ARVID AMUNDSEN.